B. D. PINKNEY.
DOUGH MIXER.
APPLICATION FILED NOV. 13, 1920.

1,392,446.

Patented Oct. 4, 1921.

2 SHEETS—SHEET 1.

Inventor:
Bryant D. Pinkney.

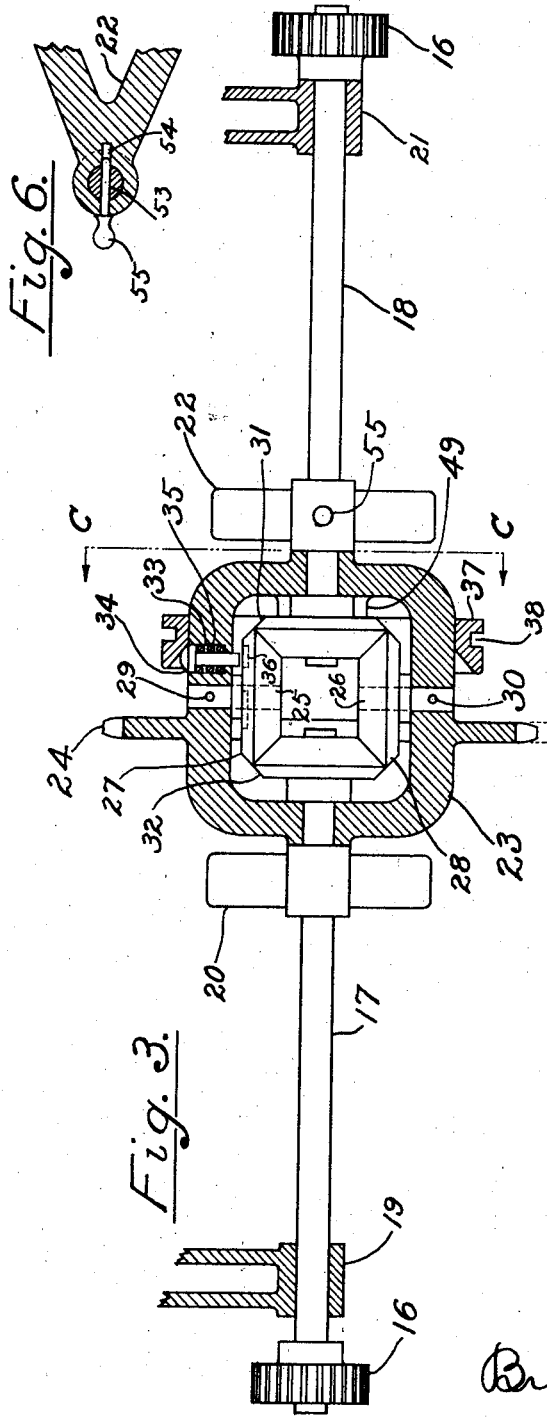

UNITED STATES PATENT OFFICE.

BRYAN D. PINKNEY, OF NEWPORT, KENTUCKY.

DOUGH-MIXER.

1,392,446. Specification of Letters Patent. Patented Oct. 4, 1921.

Application filed November 13, 1920. Serial No. 423,797.

*To all whom it may concern:*

Be it known that I, BRYAN D. PINKNEY, a citizen of the United States, residing at Newport, in the county of Campbell and State of Kentucky, have invented certain new and useful Improvements in Dough-Mixers, of which the following is a specification.

My invention relates to an improvement in the kneading, mixing and stretching of dough, and similar masses of a doughy or plastic nature in which a plurality of differentially-operated mixing arms work the mass to a perfectly homogeneous substance; and the objects of my improvement are, first, to subject the contents to a thorough mixing, causing the dry and liquid ingredients to become correctly blended and homogeneously mixed and then to assume the form of a partially cohesive mass; and second, by the continued action of the agitator, or mixing arms, to so completely stretch and evenly knead the dough or plastic mass, by means of the differential action, that plenty of air is beaten in while the mass is being mixed to a perfectly homogeneous state, thereby producing a product of the same specific gravity throughout in which like volumes possess like weight. This produces a dough rich in nutritive qualities and one that proves well, besides being of fine grain.

I attain these objects by the various instrumentalities of which my invention consists, a form of which I have shown in the accompanying drawings, although my invention is not limited to the precise arrangement and organization of these instrumentalities as herein shown and described.

Figure 2:
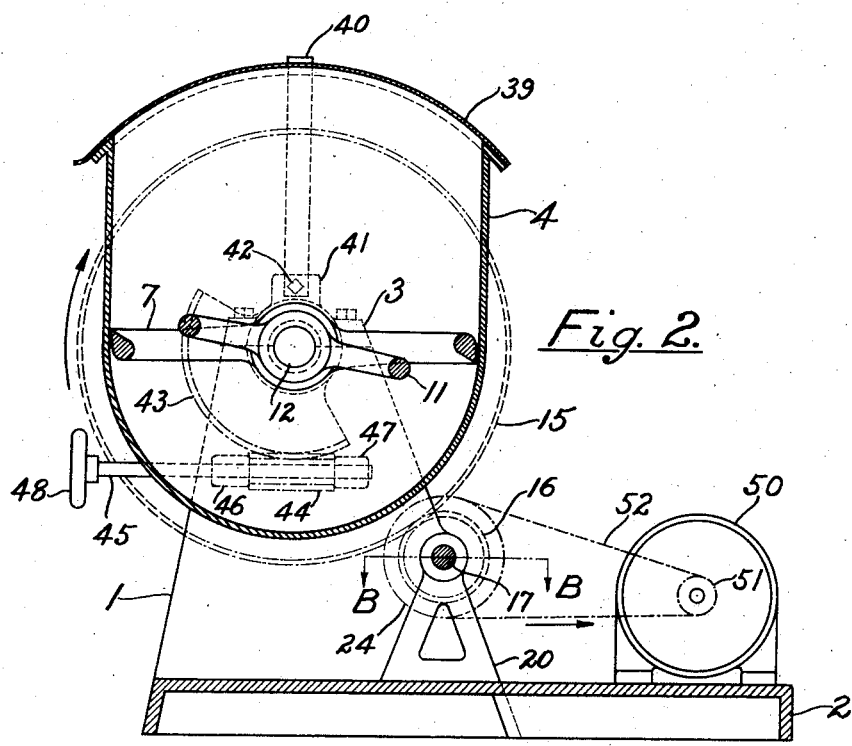
Figure 1:
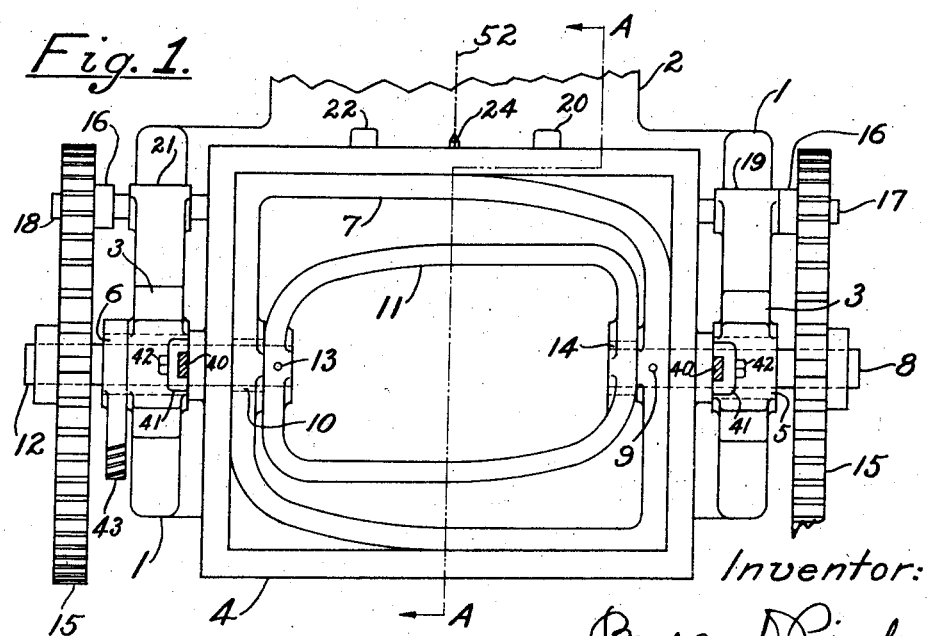

Figure 1 is a plan view of my improved apparatus, with the extended base shown broken away and the canopy cover removed; Fig. 2, a cross section at line A—A, Fig. 1; Fig. 3, an enlarged view of the differential shaft taken at line B—B, Fig. 2; Fig. 4, a cross section of the differential shaft taken at line C—C, Fig. 3; Fig. 5, a plan view of the gear for locking the differential; Fig. 6, a sectional view of an arrangement to hold one mixing arm stationary.

Referring to the drawings, 1 designates the main frame which is shown provided with an extension base 2. At the top of the main frame are caps 3 in which are trunnioned the trunnions 5 and 6 of the mixing bowl or receptacle 4.

The agitator comprises a pair of blades or mixing arms, an outer mixing arm 7, and an inner mixing arm 11. The outer arm 7 is rigidly fastened to drive shaft 8 by any suitable means, such as by pin 9, and provided with a bushing 10 at the opposite side and loosely mounted on drive shaft 12. The inner arm 11 is rigidly fastened to drive shaft 12 by any suitable means, such as by pin 13, and provided with a bushing 14 at the opposite side and loosely mounted on drive shaft 8. I do not limit my construction of the drive shafts 8 and 12 and the bushings 10 and 14, respectively, to this particular description, as the mixing arms may be driven by means of sleeves, such as shown in Patent No. 445,204, dated Jan. 27, 1891, and Patent No. 831,372, dated Sept. 18, 1906, or other types of mixing apparatus using the "sleeve" drive.

Suitable stuffing-boxes are provided to prevent leakage, but being of any ordinary construction they are not shown in the drawings.

Rotary motion is applied to the drive shafts 8 and 12 by means of gears 15, mating in drive pinions 16, securely fastened on each end of the differential shafts as shown in Fig. 3. The differential shaft 17 is mounted in bearing 19 of the main frame 1 at one end and near the other end in bracket 20. The differential shaft 18 is mounted in bearing 21 of the main frame 1 at one end and near the other end in bracket 22. Brackets 20 and 22 are securely fastened to the main frame 1.

The differential drive is the new and improved feature of applicant's invention and is not to be found in any other mixing apparatus known to him. In ordinary dough mixers the dough is mixed either by a single blade or by a plurality of mixing blades of predetermined speed, and this produces a dough of varying densities and irregular specific gravities due to the lack of homogeneity, and hence like volumes vary considerably in weight. It is estimated by the applicant that the percentage of weight variation is often 25%, and this is the underlying reason why heavy weights are necessary to compress the dough, when weighing dough in a dough divider such as disclosed in Patent No. 597,089, dated Jan. 11, 1898, or Patent No. 722,545, dated March 10, 1903, in order to compress the irregular mass into an even mass where like volumes possess like weight. With the differential action, if the dough in contact with the outer arm 7 offers more resistance than the dough in contact with the inner arm 11, it indicates that the dough in contact with the inner arm 11 is not so developed and so the differential shaft 17 that drives the outer arm 7 will retard and differential shaft 18 will speed up in the same ratio until like resistances are offered the mixing arms 7 and 11. This action also works a correct proportion of air into the dough or plastic mass.

The differential comprises a main frame 23 to which is attached a sprocket 24, or any other suitable means to rotate said frame 23. Rigidly mounted in frame 23 are studs 25 and 26 and secured by any suitable means, such as pins 29 and 30, respectively. Loosely mounted on stud 25 is gear 27 and loosely mounted on stud 26 is gear 28. The gears 27 and 28 mesh with gears 31 and 32 rigidly mounted on differential shafts 17 and 18, respectively. As the frame 23 rotates, and there are equal resistances applied to differential shafts 17 and 18, there will be no rotation of the gears 27 and 28 on studs 25 and 26, respectively, and pinions 16 will rotate with equal velocities. As different resistances are offered differential shafts 17 and 18 there will be a corresponding slowing down of one and a speeding up of the other, which will continue or alternate until the differential shafts 17 and 18 rotate at equal velocities or either with equal resistances, and then the dough is mixed to a homogeneous mass.

It sometimes is advantageous to be able to lock the differential so that the outer and the inner mixing blades rotate at predetermined speeds—chiefly for cleaning purposes. This I accomplish by means of the plunger 34 mounted in hole 33 of the frame 23. A spring 35 serves to keep the plunger 34 out of operative position. I have shown a spanner ring 37 with a spanner groove 38 to operate the plunger 34, and press it down into grooves 36 of gear 27. The spanner ring may be moved forward and backward by any ordinary means, and hence not shown in the drawing. I do not limit myself to a differential of the bevel-gear type as shown, as a spur-gear type is equally as effective. Projections 49 serve to guide spanner ring 37.

The mixing apparatus is shown provided with a canopy cover 39. This cover is shown fastened to the caps 3 by means of braces 40 terminating in projections 41, and secured by bolts 42. This canopy cover always remains in a vertical position above the mixing bowl 4. I prefer to use that type of canopy cover disclosed in my Patent No. 1,375,416, dated April 19, 1921.

The mixing bowl 4 is tilted forward to discharge the mixed batch by any suitable means, such as by means of the chordal wormwheel 43 rigidly mounted on the end of trunnion 6, and meshing with a worm 44 rigidly mounted on shaft 45. Shaft 45 is loosely mounted in bearings 46 and 47 attached to the side of the main frame 1. Shaft 45 may be operated by power, or by handwheel 48 for manual operation.

Motive power is applied to my improved mixing apparatus by any suitable means, such as by electric motor 50 and gear 51. Gear 51 may mesh directly with gear 24 or 51 may be a sprocket, and 52 a sprocket chain or other flexible drive that connects the sprockets 24 and 51.

In case my improved mixing apparatus is to be used for mixing sponge doughs where a higher peripheral mixing speed of the outer mixing arm is desirable, I dispense with the rotation of the inner arm 11 by locking the shaft 18 by any suitable means, such as for example, by inserting a pin 55 through a hole 53 in shaft 18 and a mating hole 54 in bracket 22. Gear 31 then, not being able to rotate, imparts rotary action to the gears 25 and 26 as the frame 23 rotates, and this increases or accelerates the normal speed of gear 32, imparting to shaft 17 a greatly increased or accelerated speed.

In operation, my improved mixing apparatus works as follows: The ingredients to be mixed (usually for bread doughs, which comprise flour, salt, sugar, lard, yeast and water) are placed in the mixing bowl 4 either just before the mixing apparatus is started or while it is in operation. The ingredients are such, generally, that must first be blended (which blending takes place in the mixing process before the ingredients assume the form of a cohesive mass), and then stretched and kneaded. The ingredients are worked until they are of the correct consistency, that is, until the resistances offered the outer arm and the inner arm are the same. The method of compensating for the resistance is accomplished by means of the differential, which operates to produce a dough wherein the gluten is fully developed, and the resulting chemical action tends to keep the temperature comparatively low, producing a perfectly homogeneous dough of maximum strength in a minimum of time.

Having thus described my invention, what I claim as new, and desire to secure by Letters Patent, is—

1. In a dough mixer, a plurality of mixing arms, and means controlled by the variations in the consistency of the material worked upon to automatically change the speed ratio of the mixing arms, so that a homogeneous substance is effected.

2. In a dough mixer, a plurality of mixing arms, and a differential drive controlled by the variations in the consistency of the material worked upon to automatically vary the speeds of the mixing arms, so that a homogeneous substance is effected.

3. In a dough mixer, a mixing receptacle, a plurality of mixing arms rotatably mounted in the mixing receptacle, and a differential drive controlled by the variations in the consistency of the material worked upon to automatically vary the speeds of the mixing arms, so that a homogeneous substance is effected.

4. In a dough mixer, a plurality of mixing arms, a differential drive controlled by the variations in the consistency of the material worked upon to automatically vary the speeds of the mixing arms, and means whereby the differential drive may be locked so that the said mixing arms may be run at a predetermined speed.

5. In a dough mixer, a plurality of mixing arms, means controlled by the variations in the consistency of the material worked upon to automatically vary the speeds of the mixing arms, and means whereby one mixing arm may be held stationary.

6. In a dough mixer, a pair of mixing arms, means controlled by the variations in the consistency of the material worked upon to automatically vary the speeds of the mixing arms, means adapted to lock the aforestated means so that the mixing arms may be run at a predetermined speed, and means adapted to hold one mixing arm stationary so that a greatly accelerated speed is imparted to the other mixing arm.

In testimony whereof I affix my signature.

BRYAN D. PINKNEY.